US009874274B2

(12) United States Patent
Sheridan et al.

(10) Patent No.: US 9,874,274 B2
(45) Date of Patent: *Jan. 23, 2018

(54) OIL BAFFLE FOR GAS TURBINE FAN DRIVE GEAR SYSTEM

(71) Applicant: United Technologies Corporation, Hartford, CT (US)

(72) Inventors: William G. Sheridan, Southington, CT (US); Michael E. McCune, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 782 days.

This patent is subject to a terminal disclaimer.

(21) Appl. No.: 14/485,039

(22) Filed: Sep. 12, 2014

(65) Prior Publication Data

US 2015/0267802 A1 Sep. 24, 2015

Related U.S. Application Data

(60) Continuation of application No. 13/861,602, filed on Apr. 12, 2013, now Pat. No. 8,898,900, which is a
(Continued)

(51) Int. Cl.
*F02C 7/36* (2006.01)
*F16H 57/04* (2010.01)
(Continued)

(52) U.S. Cl.
CPC ......... *F16H 57/0427* (2013.01); *F01D 25/18* (2013.01); *F02C 3/04* (2013.01);
(Continued)

(58) Field of Classification Search
CPC ............... F16H 57/0427; F16H 57/046; F16H 57/0482; F16H 57/0479; F16H 57/0423;
(Continued)

(56) References Cited

U.S. PATENT DOCUMENTS 2,591,743 A 4/1952 Thompson
3,650,353 A 3/1972 Abbott
(Continued)

FOREIGN PATENT DOCUMENTS

DE 3410977 9/1985
EP 1783344 12/2009
(Continued)

OTHER PUBLICATIONS

Extended European Search Report for application No. EP 07 25 2647, dated Jan. 25, 2011.
(Continued)

*Primary Examiner* — Richard Chang
(74) *Attorney, Agent, or Firm* — Carlson, Gaskey & Olds, P.C.

(57) ABSTRACT

A geared architecture includes a carrier that has spaced apart walls with circumferentially spaced mounts that interconnect the walls. The mounts provide circumferentially spaced apart apertures between the mounts at an outer circumference of the carrier. A sun gear and intermediate gears are arranged about and intermesh with the sun gear. The intermediate gears are supported by the carrier. The intermediate gears extend through the apertures to intermesh with a ring gear. A baffle is supported relative to the carrier and includes a lubrication passage near at least one of the sun gear and intermediate gears for directing a lubricant on the at least one of the sun gear and intermediate gears. The lubrication passage includes a primary passage that extends laterally between the walls and first and second passages and is in communication with the primary passage and respectively terminates near the sun gear and intermediate gears.

28 Claims, 5 Drawing Sheets

Related U.S. Application Data continuation of application No. 13/346,790, filed on Jan. 10, 2012, now Pat. No. 8,640,336, which is a continuation of application No. 12/718,436, filed on Mar. 5, 2010, now Pat. No. 8,276,275, which is a division of application No. 11/481,112, filed on Jul. 5, 2006, now Pat. No. 7,704,178.

(51) Int. Cl.
  *F01D 25/18* (2006.01)
  *F02C 3/04* (2006.01)
  *F16H 57/08* (2006.01)

(52) U.S. Cl.
  CPC ............ *F02C 7/36* (2013.01); *F16H 57/046* (2013.01); *F16H 57/0421* (2013.01); *F16H 57/0423* (2013.01); *F16H 57/0479* (2013.01); *F16H 57/0482* (2013.01); *F05D 2230/60* (2013.01); *F05D 2260/40311* (2013.01); *F05D 2260/98* (2013.01); *F16H 57/0486* (2013.01); *F16H 57/082* (2013.01); *Y10T 29/4932* (2015.01); *Y10T 29/49316* (2015.01); *Y10T 29/49323* (2015.01); *Y10T 29/49464* (2015.01)

(58) Field of Classification Search
  CPC .......... F16H 57/0421; F02C 3/04; F02C 7/36; F01D 25/18; Y10T 29/49323; Y10T 29/49464; Y10T 29/4932; Y10T 29/49316; F05D 2260/98; F05D 2260/40311; F05D 2230/06
  See application file for complete search history.

(56) References Cited

U.S. PATENT DOCUMENTS

| | | |
|---|---|---|
| 3,853,432 A | 12/1974 | Cronstedt |
| 4,271,928 A | 6/1981 | Northern |
| 4,378,711 A | 4/1983 | Daniel |
| 4,827,712 A | 5/1989 | Coplin |
| 4,914,904 A | 4/1990 | Parnes |
| 5,391,125 A | 2/1995 | Turra et al. |
| 5,433,674 A | 7/1995 | Sheridan et al. |
| 5,466,198 A | 11/1995 | McKibbin et al. |
| 5,472,383 A | 12/1995 | McKibbin |
| 6,158,210 A | 12/2000 | Orlando |
| 6,223,616 B1 | 5/2001 | Sheridan |
| 6,905,303 B2 | 6/2005 | Liu et al. |
| 7,011,599 B2 | 3/2006 | Becquerelle et al. |
| 7,033,301 B2 | 4/2006 | Kimes |
| 7,104,918 B2 | 9/2006 | Mitrovic |
| 7,112,157 B2 | 9/2006 | Uebbing |
| 7,214,160 B2 | 5/2007 | Illerhaus |
| 7,490,460 B2 | 2/2009 | Moniz et al. |
| 7,704,178 B2 | 4/2010 | Sheridan et al. |
| 7,883,439 B2 * | 2/2011 | Sheridan ................ F01D 25/18 475/159 |
| 8,276,275 B2 | 10/2012 | Sheridan et al. |
| 8,898,900 B2 * | 12/2014 | Sheridan ................ F01D 25/18 29/889 |
| 2005/0026744 A1 | 2/2005 | Illerhaus et al. |
| 2009/0111639 A1 | 4/2009 | Klingels |

FOREIGN PATENT DOCUMENTS

| | | |
|---|---|---|
| EP | 2559913 | 2/2013 |
| JP | 6-1889 | 1/1994 |
| JP | 2001-208146 | 8/2001 |
| JP | 2005-163666 | 6/2005 |
| JP | 2005-207472 | 8/2005 |
| WO | 2007054066 | 5/2007 |

OTHER PUBLICATIONS

European Search Report for European Patent Application No. 12180834.9 Completed Dec. 7, 2012.

* cited by examiner

OIL BAFFLE FOR GAS TURBINE FAN DRIVE GEAR SYSTEM

REFERENCE TO RELATED APPLICATIONS

This application is a continuation of U.S. patent application Ser. No. 13/861,602, filed on 12 Apr. 2013, which is a continuation of U.S. patent application Ser. No. 13/346,790, filed on 10 Jan. 2012, now U.S. Pat. No. 8,640,336, issued 4 Feb., 2014. U.S. patent application Ser. No. 13/346,790 is a continuation of U.S. patent application Ser. No. 12/718,436, filed on 5 Mar. 2010, now U.S. Pat. No. 8,276,275, issued 2 Oct., 2012 which is a divisional of U.S. patent application Ser. No. 11/481,112, filed 5 Jul. 2006, now U.S. Pat. No. 7,704,178, issued 27 Apr. 2010.

BACKGROUND OF THE INVENTION

This disclosure relates to a gas turbine engine architecture.

Gas turbine engines typically employ an epicyclic gear train connected to a turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan. In arrangements in which the ring gear is fixed against rotation, the intermediate gears are referred to as "planetary" gears and the carrier is coupled to the output shaft that supports the turbo fan.

The epicyclic gear train gears must receive adequate lubrication during operation of the turbine engine. To this end, the carrier includes oil spray bars arranged between the intermediate gears and the sun gear to spray oil directly on those gears. Separate oil baffles, which may be integral with or separate from the carrier, are arranged between the intermediate gears to collect the sprayed oil and retain it in the area of the intermediate gears for prolonged lubrication before the oil is collected in a lubricant gutter associated with the ring gear.

Prior art carrier arrangements have required multiple components and complicated assembly in order to accommodate the oil baffles. For example, one or both of the side walls of the carrier must be assembled around the intermediate gears resulting in a multi-piece carrier. Furthermore, separate oil spray bars and oil baffles complicate assembly and increase cost. What is needed is a simplified oil baffle and spray bar arrangement that enables a simpler and less expensive carrier design.

SUMMARY OF THE INVENTION

In one exemplary embodiment, a geared architecture includes a carrier that has spaced apart walls with circumferentially spaced mounts that interconnect the walls. The mounts provide circumferentially spaced apart apertures between the mounts at an outer circumference of the carrier. A sun gear and intermediate gears are arranged about and intermesh with the sun gear. The intermediate gears are supported by the carrier. The intermediate gears extend through the apertures to intermesh with a ring gear. A baffle is supported relative to the carrier and includes a lubrication passage near at least one of the sun gear and intermediate gears for directing a lubricant on the at least one of the sun gear and intermediate gears. The lubrication passage includes a primary passage that extends laterally between the walls and first and second passages and is in communication with the primary passage and respectively terminates near the sun gear and intermediate gears.

In a further embodiment of the above, a tube extends through a hole in one of the walls. The tube is in communication with the primary passage.

In a further embodiment of any of the above, a ring gear intermeshes with the intermediate gears and an output shaft is interconnected to the ring gear. An input shaft is interconnected to the sun gear.

In a further embodiment of any of the above, the carrier is fixed relative to a housing.

In a further embodiment of any of the above, the housing supports a torque frame that is secured to the mounts.

In a further embodiment of any of the above, the baffle is secured to the carrier with fasteners.

In a further embodiment of any of the above, the baffle is integral with the carrier.

In another exemplary embodiment, a geared architecture includes a carrier. A sun gear and intermediate gears are arranged about and intermesh with the sun gear. The intermediate gears are supported by the carrier. A baffle that is supported relative to the carrier includes a lubrication passage near at least one of the sun gear and intermediate gears for directing a lubricant on the at least one of the sun gear and intermediate gears. A spray bar is external to the carrier and is in communication with the lubrication passage. The spray bar terminates near the sun gear for directing lubricant on the sun gear.

In a further embodiment of the above, a tube extends through a hole in one of the walls. The tube is in communication with the primary passage.

In a further embodiment of any of the above, a ring gear intermeshes with the intermediate gears and an output shaft is interconnected to the ring gear. An input shaft is interconnected to the sun gear.

In a further embodiment of any of the above, the carrier is fixed relative to a housing.

In a further embodiment of any of the above, the housing supports a torque frame that is secured to the mounts.

In a further embodiment of any of the above, the baffle is secured to the carrier with fasteners.

In a further embodiment of any of the above, the baffle is integral with the carrier.

In another exemplary embodiment, a method of designing a geared architecture includes defining a carrier that has spaced apart walls with circumferentially spaced mounts that interconnect the walls. The mounts are defined to provide circumferentially spaced apart apertures between the mounts at an outer circumference of the carrier. A sun gear is defined and intermediate gears are arranged about and intermesh with the sun gear. The intermediate gears are defined to be supported by the carrier. The intermediate gears are defined to extend through the apertures to intermesh with a ring gear. A baffle is defined and is supported relative to the carrier and includes a lubrication passage near at least one of the sun gear and intermediate gears for directing a lubricant on at least one of the sun gear and intermediate gears. The lubrication passage includes a primary passage that extend laterally between the walls and first and second passages in communication with the primary passage.

In a further embodiment of the above, a tube is defined to extend through a hole in one of the walls. The tube is configured to be in communication with the primary passage.

In a further embodiment of any of the above, a ring gear is defined and intermeshes with the intermediate gears. An output shaft is interconnected to the ring gear. An input shaft is defined and is interconnected to the sun gear.

In a further embodiment of any of the above, the carrier is defined to be fixed relative to a housing.

In a further embodiment of any of the above, the housing is defined to support a torque frame that is configured to be secured to the mounts.

In a further embodiment of any of the above, the baffle is defined to be secured to the carrier with fasteners.

In a further embodiment of any of the above, the baffle is defined to be integral with carrier.

In another exemplary embodiment, a method of designing a geared architecture includes defining a carrier and defining a sun gear and intermediate gears that are arranged about and intermesh with the sun gear. The intermediate gears are configured to be supported by the carrier. A baffle is defined to be configured relative to be supported by the carrier and include a lubrication passage near at least one of the sun gear and intermediate gears for directing a lubricant on at least one of the sun gear and intermediate gears. A spray bar is defined that is external to the carrier and is in communication with the lubrication passage. The spray bar is configured to terminate near the sun gear for directing lubricant on the sun gear.

In a further embodiment of any of the above, a tube is defined to extend through a hole in one of the walls. The tube is configured to be in communication with the primary passage.

In a further embodiment of any of the above, a ring gear is defined and intermeshes with the intermediate gears and an output shaft interconnected to the ring gear. An input shaft is defined that interconnects to the sun gear.

In a further embodiment of any of the above, the carrier is defined to be fixed relative to a housing.

In a further embodiment of any of the above, the housing is defined to support a torque frame that is configured to be secured to the mounts.

In a further embodiment of any of the above, the baffle is defined to be secured to the carrier with fasteners.

In a further embodiment of any of the above, the baffle is defined to be integral with the carrier.

DETAILED DESCRIPTION OF THE PREFERRED EMBODIMENT

Figure 1:
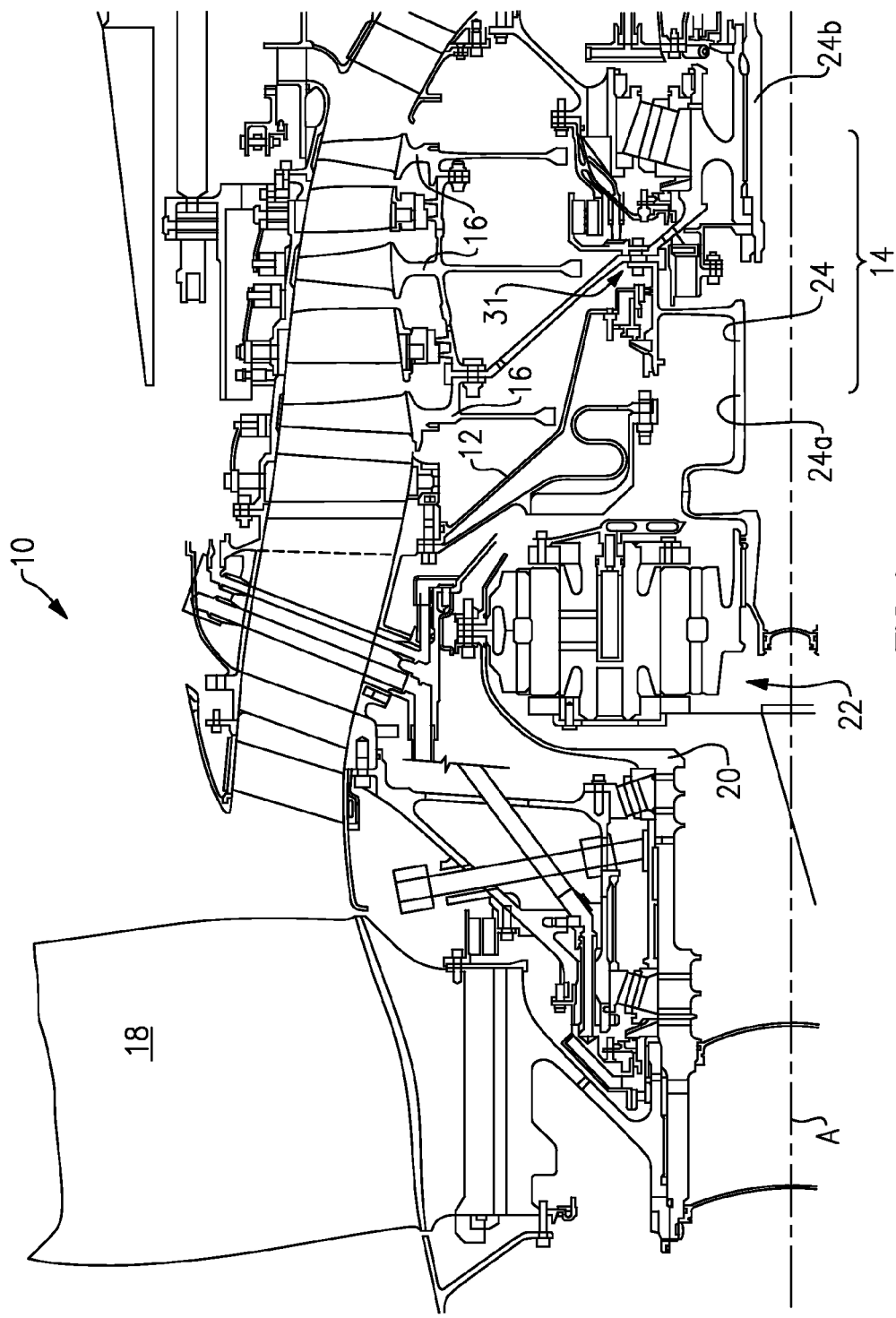
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft (not shown) about an axis A. A turbo fan 18 is supported on a turbo fan shaft 20 that is driven by a compressor shaft 24, which supports the compressor hubs 16, through an epicyclic gear train 22.

Figure 2:
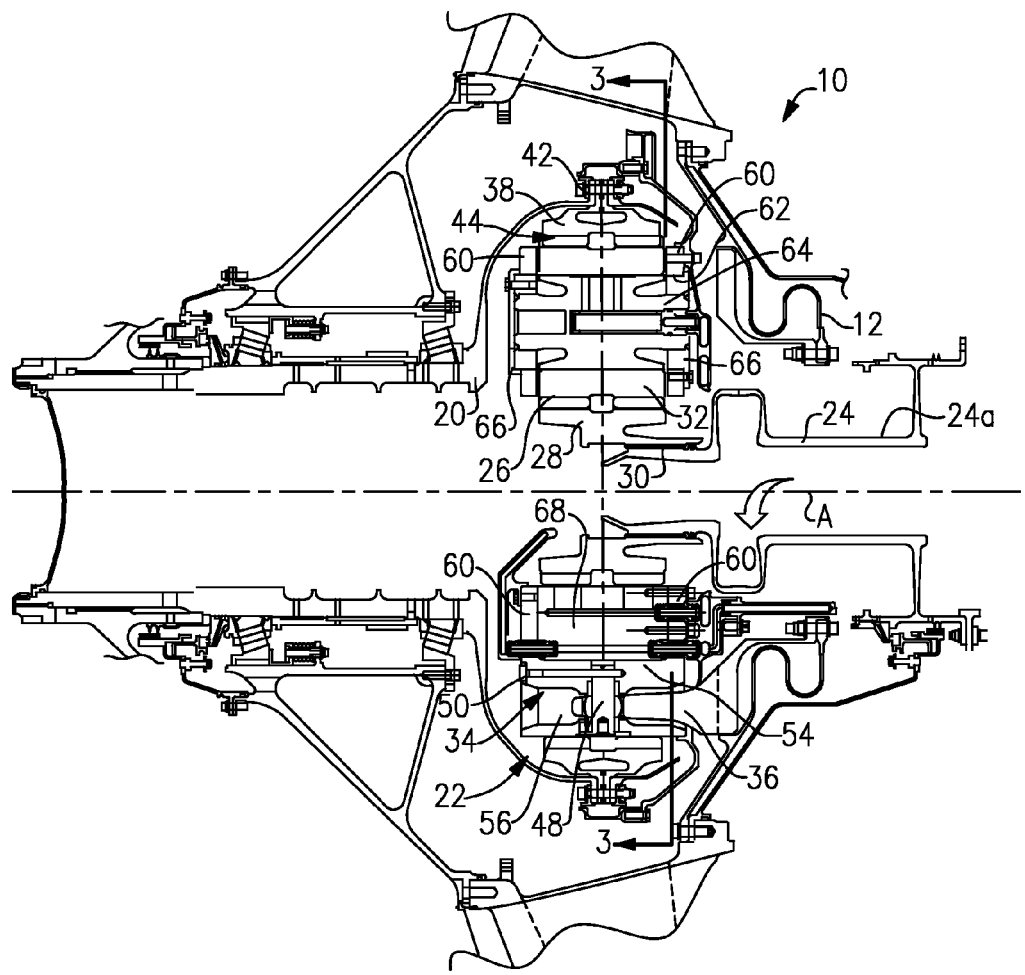
FIG. 2 is a cross-sectional view of the epicyclic gear train shown in FIG. 1.

In the example arrangement shown, the epicyclic gear train 22 is a star gear train. Of course, the claimed invention also applies to other epicyclic gear trains such as a planetary arrangement. Referring to FIG. 2, the epicyclic gear train 22 includes a sun gear 28 that is connected to the compressor shaft 24, which provides rotational input, by a splined connection 30.

In the example arrangement shown, the compressor shaft is a two-part shaft having a first shaft 24*a* and a second shaft 24*b*. The first shaft 24*a* is connected to the second shaft 24*b* via a connection member 31, which is a bolt and nut in this example.

A carrier 34 is fixed to the housing 12 by a torque frame 36. The carrier 34 supports intermediate gears (which are star gears 32 in the arrangement shown) that are coupled to the sun gear 28 by meshed interfaces 26 between the teeth of the sun and star gears 28, 32. A ring gear 38 surrounds the carrier 34 and is coupled to the star gears 32 by meshed interfaces 44. The ring gear 38, which provides rotational output, is secured to the turbo fan shaft 20 by connection 42.

Figure 3:
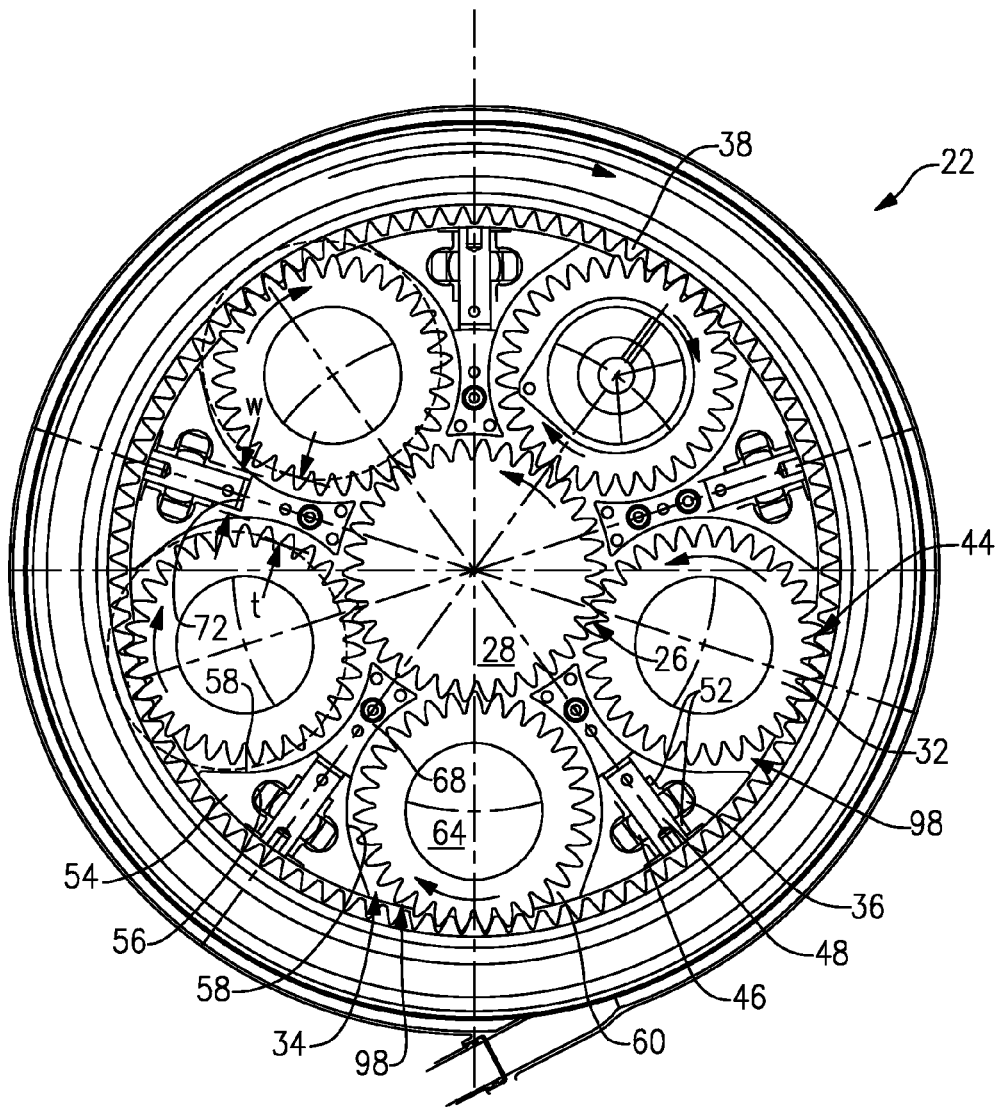
FIG. 3 is an end view of the epicyclic gear train taken along line 3-3 in FIG. 2 with a pair of star gears shown in phantom in an installation position.

In one example, the torque frame 36 grounds the carrier 34 to the housing 12 in a known manner. For example, mounts 53 have apertures 56 receiving fingers of the torque frame 36, as shown in FIGS. 2 and 3. Pins 48 that extend through spherical bearings 46 and bushings 52 secure the fingers to the carrier 34. Fasteners 50 retain the pins 48 to the carrier 34.

The carrier 34 is a unitary structure manufactured from one piece for improved structural rigidity and ease of assembly. The carrier 34 includes spaced apart side walls 60 that are interconnected by the mounts 54, which are generally wedge-shaped members, as best shown in FIG. 3. The mounts 54 and side walls 60 are unitary with one another. The mounts 54 have opposing curved surfaces 58 that are in close proximity to the star gears 32 and generally follow the curvature of the teeth of the star gears 32 so that any oil on the curved surfaces 58 will likely find its way to the star gears 32 for additional lubrication.

The mounts 54 are circumferentially spaced about the carrier 34 to provide apertures 98 through which the star gears 32 extend to engage the ring gear 38. Returning to FIG. 2, the side walls 60 include holes 62 for receiving a journal bearing 64 that supports each of the star gears 32. Each journal bearing 64 is retained within the carrier 34 by retainers 66 fastened to the side walls 60.

Figure 4:
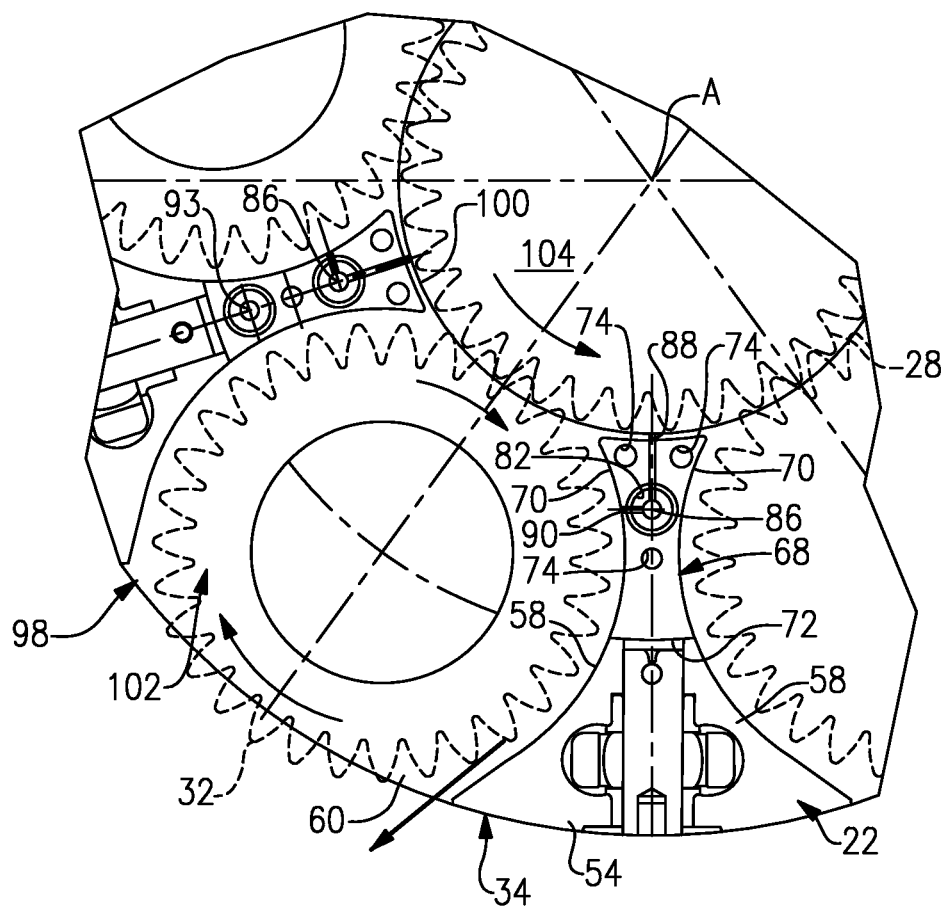
FIG. 4 is an enlarged view of a portion of the epicyclic gear train shown in FIG. 3 with a sun gear and star gears shown in phantom.
Figure 5:
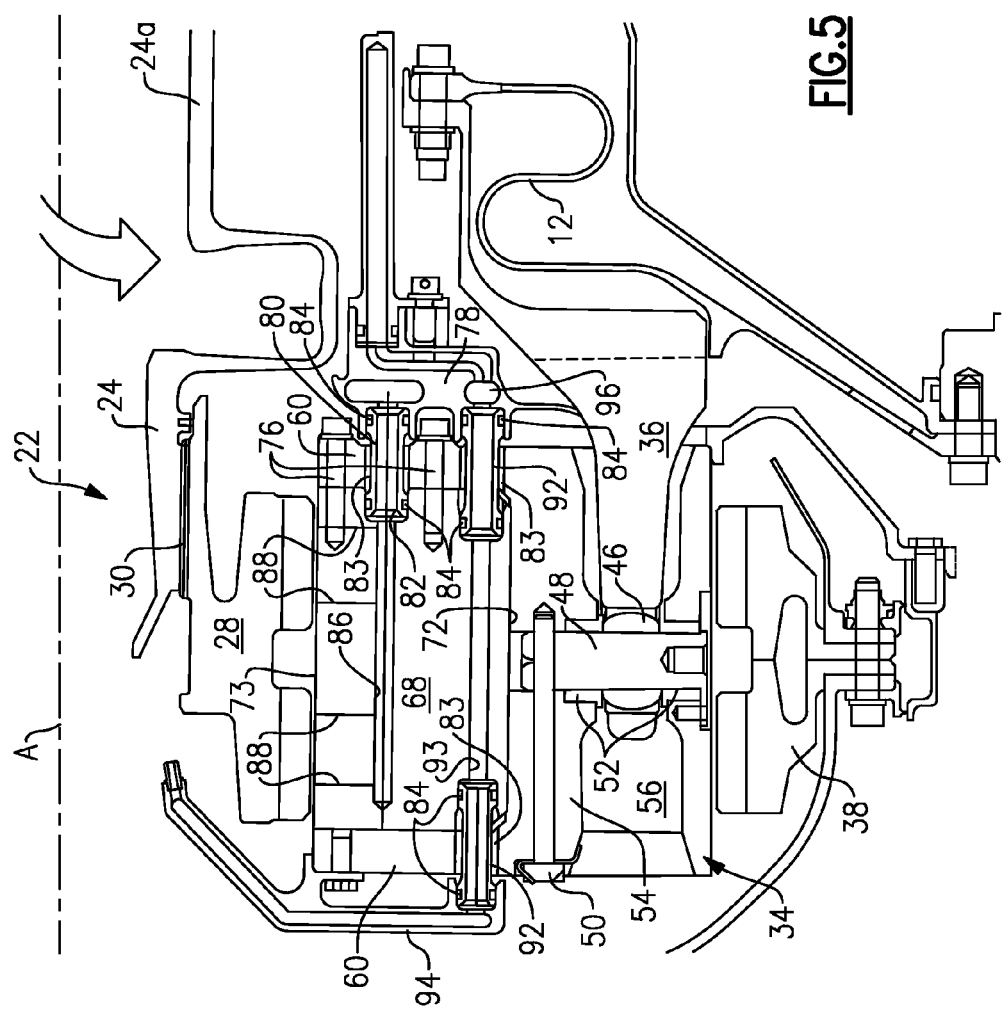
FIG. 5 is an enlarged view of a portion of the epicyclic gear train shown in FIG. 2.

Oil baffles 68 are arranged between the side walls 60 near each of the mounts 54, best shown in FIG. 2. Referring to FIGS. 4 and 5, the baffles 68 include ends 72 that abut the mounts 54, in the example shown. The baffles 68 also include opposing curved surfaces 70 arranged in close proximity to the star gears 28. The curved surfaces 58, 70 are contiguous with and adjoin one another, in the example shown, and provide gear pockets 102 that receive the star gears 32. A gear pocket 104, which receives the sun gear 28, is also provided between a surface 73 on each of the baffles 68 opposite the ends 72.

In one example, one of the side walls 60 includes holes 74 that receive fasteners 76 which secure each of the baffles 68 to the carrier 34. The baffles 68 include a lubrication passage provided by a primary passage 86 that fluidly communicates with a lubricant distributor 78. The lubricant distributor 78 is fed oil from a lubricant supply 96. In one example, the baffles 68 include openings 82 that receive a tube 80 extending through a hole 83 in the side wall 60. Seals 84 seal the tube 80 to the opening 82 and lubricant distributor 78. Other tubes 92 having seals 84 are used to provide oil to an external spray bar 94 through another lubrication passage (spray bar passage 93 that extends through one of the baffles 68). The external spray bar 94 is secured to the carrier 34 and sprays oil in the vicinity of the sun gear 28 near the splined connection 30 (shown in FIGS. 2 and 5).

The primary passage 86 is in communication with first and second passages 88, 90 that spray oil on the teeth of the sun and star gears 28, 32. In the example shown, the first and second passages 88, 90 are arranged ninety degrees from one another.

With the example baffles 68, lubricant distribution is integrated into the baffle so that separate components are eliminated. The baffles 68 can be constructed from a different, lighter weight material than the carrier 34.

The example carrier 34 can be constructed from one piece, which improves the structural integrity of the carrier. A central opening 100 is machined in at least one of the side walls 60 and provides the gear pocket 104. Gear pockets 102 are machined between the side walls 60 and mounts 54 for each of the star gears 32 and form apertures 98 at an outer circumference of the carrier 34. Referring to FIG. 3, the star gears 32 are inserted into the central opening 100 and moved radially outwardly so that they extend through the apertures 98 and are preferably in abutment with the mounts 54 (position indicated by dashed lines in FIG. 3). In this position, there is an adequate gap, t, between the teeth of adjacent star gears 32 to accommodate a width, w, of the end 72 of the baffles 68. Once the baffles 68 have been inserted, the star gears 32 can be repositioned, as shown by the solid lines, and the sun gear 28 can be inserted into the central opening 100 so that it meshes with the star gears 32. The baffles 68 are secured to the carrier 34 using fasteners 76. The tubes 80, 92 can be inserted and the rest of the lubricant distribution system can be connected.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A geared architecture comprising:
   a carrier, having spaced apart walls with circumferentially spaced mounts interconnecting the walls, the mounts providing circumferentially spaced apart apertures between the mounts at an outer circumference of the carrier;
   a sun gear and intermediate gears arranged about and intermeshing with the sun gear, the intermediate gears supported by the carrier, the intermediate gears extending through the apertures to intermesh with a ring gear; and
   a baffle supported relative to the carrier including a lubrication passage near at least one of the sun gear and intermediate gears for directing a lubricant on the at least one of the sun gear and intermediate gears, wherein the lubrication passage includes a primary passage extending laterally between the walls and first and second passages in communication with the primary passage and respectively terminating near the sun gear and intermediate gears.

2. The geared architecture according to claim 1, comprising a tube extending through a hole in one of the walls, the tube in communication with the primary passage.

3. The geared architecture according to claim 1, comprising a ring gear intermeshing with the intermediate gears and an output shaft interconnected to the ring gear, and an input shaft interconnected to the sun gear.

4. The geared architecture according to claim 3, wherein the carrier is fixed relative to a housing.

5. The geared architecture according to claim 4, wherein the housing supports a torque frame that is secured to the mounts.

6. The geared architecture according to claim 1, wherein the baffle is secured to the carrier with fasteners.

7. The geared architecture according to claim 1, wherein the baffle is integral with carrier.

8. A geared architecture comprising:
   a carrier;
   a sun gear and intermediate gears arranged about and intermeshing with the sun gear, the intermediate gears supported by the carrier;
   a baffle supported relative to the carrier including a lubrication passage near at least one of the sun gear and intermediate gears for directing a lubricant on the at least one of the sun gear and intermediate gears; and
   a spray bar external to the carrier and in communication with the lubrication passage, the spray bar terminating near the sun gear for directing lubricant on the sun gear.

9. The geared architecture according to claim 8, comprising a tube extending through a hole in one of the walls, the tube in communication with the primary passage.

10. The geared architecture according to claim 8, comprising a ring gear intermeshing with the intermediate gears and an output shaft interconnected to the ring gear, and an input shaft interconnected to the sun gear.

11. The geared architecture according to claim 10, wherein the carrier is fixed relative to a housing.

12. The geared architecture according to claim 11, wherein the housing supports a torque frame that is secured to the mounts.

13. The geared architecture according to claim 8, wherein the baffle is secured to the carrier with fasteners.

14. The geared architecture according to claim 8, wherein the baffle is integral with carrier.

15. A method of designing a geared architecture comprising:
   defining a carrier having spaced apart walls with circumferentially spaced mounts interconnecting the walls, the mounts defined to provide circumferentially spaced apart apertures between the mounts at an outer circumference of the carrier;
   defining a sun gear and intermediate gears arranged about and intermeshing with the sun gear, the intermediate gears defined to be supported by the carrier, the intermediate gears defined to extend through the apertures to intermesh with a ring gear; and
   defining a baffle supported relative to the carrier including a lubrication passage near at least one of the sun gear and intermediate gears for directing a lubricant on the at least one of the sun gear and intermediate gears, wherein the lubrication passage includes a primary passage extending laterally between the walls and first and second passages in communication with the primary passage.

16. The method according to claim 15, comprising defining a tube extending through a hole in one of the walls, the tube configured to be in communication with the primary passage.

17. The method according to claim 15, comprising defining a ring gear intermeshing with the intermediate gears and an output shaft interconnected to the ring gear, and defining an input shaft interconnected to the sun gear.

18. The method according to claim 17, comprising defining the carrier to be fixed relative to a housing.

19. The method according to claim 18, comprising defining the housing to support a torque frame that is configured to be secured to the mounts.

20. The method according to claim 15, comprising defining the baffle to be secured to the carrier with fasteners.

21. The method according to claim 15, comprising defining the baffle to be integral with carrier.

22. A method of designing a geared architecture comprising:
    defining a carrier;
    defining a sun gear and intermediate gears arranged about and intermeshing with the sun gear, the intermediate gears configured to be supported by the carrier;
    defining a baffle configured to be supported relative to the carrier including a lubrication passage near at least one of the sun gear and intermediate gears for directing a lubricant on the at least one of the sun gear and intermediate gears; and
    defining a spray bar external to the carrier and in communication with the lubrication passage, the spray bar configured to terminate near the sun gear for directing lubricant on the sun gear.

23. The method according to claim 22, comprising defining a tube extending through a hole in one of the walls, the tube configured to be in communication with the primary passage.

24. The method according to claim 22, comprising defining a ring gear intermeshing with the intermediate gears and an output shaft interconnected to the ring gear, and defining an input shaft interconnected to the sun gear.

25. The method according to claim 24, comprising defining the carrier to be fixed relative to a housing.

26. The geared architecture according to claim 25, comprising defining the housing to support a torque frame that is configured to be secured to the mounts.

27. The method according to claim 22, comprising defining the baffle to be secured to the carrier with fasteners.

28. The method according to claim 22, comprising defining the baffle to be integral with carrier.

* * * * *